Dec. 3, 1968  A. R. NORDEN  3,414,866

ELECTRICAL TERMINALS

Filed May 8, 1967

United States Patent Office 3,414,866
Patented Dec. 3, 1968

3,414,866
ELECTRICAL TERMINALS
Alexander R. Norden, 350 Central Park West,
New York, N.Y. 10025
Filed May 8, 1967, Ser. No. 636,869
11 Claims. (Cl. 339—59)

ABSTRACT OF THE DISCLOSURE

A terminal block here has a laterally threaded screw-head in a yielding-plastic insulator block; being virtually immune to shaking out of the block; ideally having special threads accommodating an inherent manufacturing out-of-step relation between mating threads at the head of the screw and at its shaft; and enabling insertion of a ring-type wire lug while the screw head supports the lower end of the screw clear of a metal insert in the terminal block.

---

The present invention relates to electrical terminals, particularly the type in which a screw is used to fasten a circuit connector such as a wire or a lug to a metal member carried by an insulator.

An object of the invention resides in providing an electrical terminal of this type with a means for supporting a screw in a position spaced from but aligned with the threaded passage that is to receive it so that there is clearance to insert a circuit connector having a closed loop for receiving the screw.

In achieving this object, a terminal structure is provided having a bearing area, a screw having a head to tighten a circuit connector against the bearing area, and a threaded passage in the terminal structure for the threaded shaft of the screw. Above the threaded passage there is a cavity of larger diameter, the wall of the cavity having threads coaxial with the threaded passage. The screw-head has lateral threads to mate with the cavity threads. The cavity is deep enough in relation to the length of the screw so that the end of the screw can be supported clear of the bearing area. This allows for free insertion of any form of circuit connector, including a wire having a circular lug.

A further object of the invention resides in providing a novel electrical screw-terminal, having a means for retaining a screw in assembly to the rest of the structure, despite the tendency of vibration and shaking to loosen and lose the screw.

A further object of the invention resides in providing a novel electrical screw-terminal of the foregoing type, in which there is no requirement that the mating threads at the head of the screw shall be in step with the mating threads at the shaft of the screw. The mating threads at both ends of the screw have the same pitch but in producing quantities of terminal structures, there will naturally be varying amounts of out-of-step relationship between the mating threads at the head of the screw in relation to the mating threads at the threaded shaft of the screw.

The foregoing objects and others are realized in an illustrative embodiment of the invention described in detail below and shown in the accompanying drawings. In this embodiment, there is a body of molded insulation having a cavity that contains a metal insert having one or more threaded passages, suitably held in place. A headed screw is included having a threaded shaft to fit the threaded insert, while the head of the screw and the cavity wall have mating threads of the same pitch as that of the insert. The insulation is of a resilient quality. Accordingly, the insulation can yield to accommodate the out-of-step condition of the screw threads on the head of the screw as enforced by the mating screw threads at the other end of the screw. A particular form of buttress screw-thread, as described below, is of special advantage for this purpose. Further, by avoiding clearance between the threads on the cavity wall and on the screw-head, and even using a negative tolerance, thereby producing a tight fit, the engagement of the resilient insulation against the screw-head tends to hold the screw against unintended rotation that might otherwise be induced by shaking and vibration.

The nature of the invention and the foregoing and further objects and novel features will be better appreciated from the following detailed description of the illustrative embodiment shown in the drawings which form part of the disclosure. In the drawings.

Figure 1:
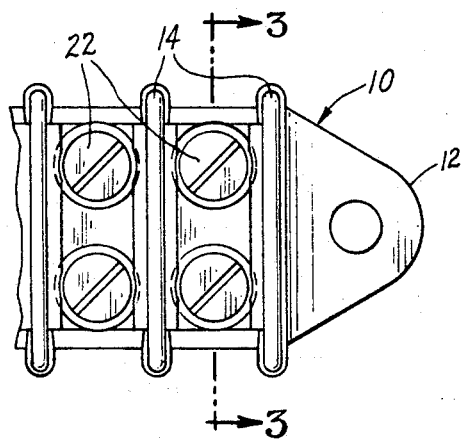
FIGURE 1 is a fragmentary plan view of a terminal strip embodying the features of the invention.

In FIG. 1, a portion of a terminal strip is shown, as one form of electrical terminal structure to which the invention is applicable. This terminal strip includes a body 10 of molded electrical insulation having a mounting ear 12 and a series of barriers 14. An insert 16 of brass or the like is disposed at the bottom of the cavity formed between each pair of barriers 14. Insert 16 includes a plate 18 and two portions 20 that have threaded bores or passages 20'. As shown, these portions 20 extend into bores in the insulating body 10 and they are spun over the insulation to secure the insert in place.

For each insert portion 20 there is a headed screw 22. The lateral surface of the screw-head has a male screw thread mating with a female thread 24 formed in raised areas of the pairs of confronting barriers 14. The female threads are thus formed in the walls of the cavities above inserts 16. The pitch of the thread on the head of the screw is the same as the pitch on the threaded shaft.

The screw threads of the screw-head and the pairs of barriers preferably have a tight fit. For special advantages, body 10 is of a yielding, relatively resilient material, particularly nylon because of its excellent properties as an electrical insulator.

The tight fit of the threaded screw-head in the female thread of the resilient plastic insulator body has the effect of holding the screws in place, resisting a tendency of screws to become unscrewed as a result of vibration of the terminal structure or shaking due to rough handling. This feature makes it unnecessary for the manufacturer of the terminal structure to tighten the screws into the metal insert before shipment for guarding against loss of the screws. Thereafter, the user would be compelled to unscrew each screw before inserting a wire or a lug.

Each of the threads of the screw-head and the cavity has lateral surfaces that meet at a ridge. One of these lateral surfaces is transverse to the screw axis and the other lateral surface slopes toward the screw axis and away from the insert, that is, the slope is toward the axis and upward (when the insert is below the cavity in the position illustrated in FIG. 2). This is specially useful in case of an out-of-step condition between the threads of the screw and the insert in relation to the threads of the screw-head and the cavity walls. Even though the mating screw threads at the screw-head and at the shaft of the screw have the same pitch, the out-of-step condition should be expected in the ordinary course of manufacture of these terminal structures. There is no control over the relation between the female cavity threads and the insert threads 20', although they are coaxial and of equal pitch. Further, the threads on the head and the shaft of the screw are coaxial and of equal pitch but there may be no controlled relation between these two threads, axially.

Figure 2:
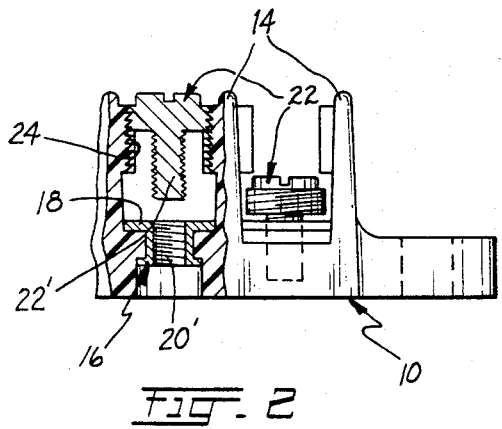
FIGURE 2 is a fragmentary lateral view of the terminal strip in FIG. 1, certain parts being broken away and shown in cross-section.

It might be imagined that a screw is being driven toward the insert from the position at the left of FIG. 2, and if the threads of the screw shaft mate naturally with the threads 20' in the insert then the threads may be regarded in step. However, it is probable that a significant out-of-step condition will exist ordinarily. As the screw shaft reaches the insert, its thread may be out of step with that of the insert, by 180° for example, and in that event the screw would not continue to advance as it is being turned. When the screw is blocked in this manner by the insert, continued rotation of the screw forces the screw-head to rise in relation to the screw threads in the cavity walls. This is possible even where there is a tight fit of the screw-head in the thread of the cavity because the insulation has a yielding quality as mentioned above. The amount of such forcible shift of the head of the screw relative to the cavity threads depends on the extent of the out-of-step condition, and is necessarily less than the pitch of the threads.

An additional advantage of the buttress form of the threads at the head of the screw is that it can absorb a downward screwdriver thrust. Since the sidewalls are resilient in this embodiment, a standard V-thread might "ratchet" down upon application of pressure. If the pressure were not applied axially there is a strong probability that the "ratcheting" would occur more on one side than the other, thus tilting the screw out of line with the threaded opening in the metal insert. If the insulating body were made of rigid material, then special attention should be devoted to provide assurance that the mating threads at the head of the screw are "in step" with the mating threads at the screw shaft, and in that case V-threads can be used quite satisfactorily to replace the buttress form of thread in the embodiment illustrated.

Figure 4:
FIGURE 4 is a view of a widely used conventional form of lug that may be used readily with the terminal strip of FIGS. 1–3.

As seen in FIG. 2 at the left, the length of the screw in relation to the depth of the cavity is such that there is a clearance space between plate 18 of the insert and the lower end of screw 22 when the screw-head is near the top of its cavity. This makes it easy to insert a circuit connector, even the ring-type crimp-on lug shown in FIG. 4. The screw can then be advanced, with assurance that the mating threads of the screw-head and the cavity will direct the end of the screw toward the threaded passage in the insert.

Figure 3:
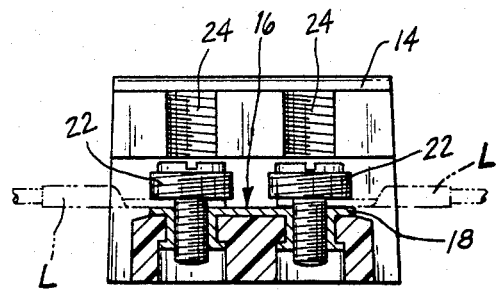
FIGURE 3 is a cross-sectional view of the terminal strip of FIGS. 1 and 2, as viewed at the line 3—3 in FIG. 1.

As shown in FIG. 3, there are two lugs L in place under screws 22. Plate 18 forms a circuit connection between the lugs L. This is only one form of connection that may be made. An electrical appliance or the like may have one or more single-screw terminal structures as its terminals. Also, plural circuit connectors such as plural lugs L may be connected together by a single screw 22.

It is of advantage to limit the threaded areas 24 of the cavity walls, as shown in FIG. 3. The walls of the cavity are relieved above the insert 16, so that there is a lateral clearance space about the screw-head. The screw can be rotated without friction at the head of the screw after the screw shaft has entered the insert, until it is fully tightened.

When the ring-type lug L is to be released, screw 22 must be withdrawn from the position shown at the right of FIG. 2 to the position shown at the left. This effect is realized by virtue of the cooperating threads in the cavity walls and on the screw-head, which lift the lower end of the screw away from the insert. Starting from its lowermost position against a lug L, the head of the screw rises until it reaches the threaded area 24. Once again, the yielding quality of the insulation accommodates any out-of-step condition that may exist between the cavity thread and the head of the screw, in relation to the threaded engagement of the shaft of the screw in the insert. It will be appreciated that, to the extent that there is usually some looseness of fit of a screw in a threaded metal passage, some limited latitude of the out-of-step condition would be accommodated without reliance on the yielding insulation. Also, the yielding property of the insulation could be made unnecessary by using manufacturing methods that would avoid the possibility of the out-of-step condition. However, it is of considerable advantage not to depend on any such exacting manufacturing methods.

The foregoing represents a presently preferred example of the invention in its various aspects. However, it will be recognized that those skilled in the art will readily modify the details shown and will adapt the novel features to other applications. Consequently the invention should be broadly construed, consistent with its full spirit and scope.

What is claimed is:

1. An electrical terminal structure for securing an inserted circuit connector, including a body of insulation, means in said body providing a bearing area against which a circuit connector is to be tightened, a screw-threaded passage that opens into said bearing area, said body including means forming a cavity having a female screw-thread coaxial with said screw-threaded passage and of greater diameter, said body being formed with means for admitting a circuit connector laterally to said bearing area, and a screw having a head and having a screw-threaded shaft for threaded engagement with said screw-threaded passage to tighten said head against an inserted circuit connector on said bearing area, said head having a male screw-thread for cooperation with said female screw-thread.

2. A terminal structure in accordance with claim 1, wherein said body is of a yielding molded plastic and wherein said female thread in said cavity and said male thread of the screw-head have firm frictional contact for resisting any tendency of the screw to become unscrewed from said body when the terminal structure is subjected to vibration or shaking.

3. A terminal structure in accordance with claim 1 especially suitable for circuit connectors having ring-type lugs, wherein the length of the screw is related to the axial length of the cavity so that there is a clearance space between said bearing area and the end of the screw for admitting a ring-type lug while the screw is supported by cooperation of the threads of the screw-head and the cavity.

4. A terminal structure in accordance with claim 1 wherein said female screw-thread of said cavity terminates at a sufficient distance from said bearing area to provide a clearance space between said head and said female screw-thread while said head approaches and bears against a circuit connector on said bearing surface.

5. A terminal structure in accordance with claim 1 especially suitable for circuit connectors having ring-type lugs, wherein said female thread extends along only a portion of the cavity means, said portion being spaced from said bearing area so that the screw-head is free of the female screw-thread when the head is close to a ring-type lug on said bearing area and wherein the length of the cavity along the screw is related to the length of the screw so that there is a clearance space between the screw and the bearing area for admitting a ring-type lug while the screw is supported in alignment with the threaded passage by cooperation between the threads of the screw-head and the cavity.

6. A terminal structure in accordance with claim 4 wherein said body is of resilient insulation so that the female thread can yield and be forcibly displaced by the male thread on the screw-head in case of an out-of-step condition between the mating threads at the head of the screw in relation to the mating threads at its shaft, said electrical terminal structure including a metal insert secured in said body of resilient insulation, said screw-threaded passage being formed in said metal insert.

7. A terminal structure in accordance with claim 1 wherein said body is of resilient insulation and wherein each of said male and female screw-threads has lateral surfaces merging at a ridge, one of said lateral surfaces being substantially transverse to the screw axis and the other of said lateral surfaces sloping inward toward the screw axis and away from said bearing area, to accommodate forcible shift of the thread on the screw-head out of its normal fit in the screw-thread of the cavity when the screw-threaded shaft is in said threaded passage if there should be any out-of-step condition of the threads at the head of the screw in relation to the threads at its shaft.

8. A terminal structure in accordance with claim 1 wherein said body is of resilient insulation and wherein each of said male and female threads has lateral surfaces merging at a ridge, one of said lateral surfaces being substantially transverse to the screw axis and the other of said lateral surfaces sloping inward toward the screw axis and away from said bearing area, to accommodate forcible shift of the thread on the screw-head out of its normal fit in the screw-thread of the cavity when the screw-threaded shaft is in said threaded passage if there should be any out-of-step condition of the threads at the head of the screw in relation to the threads at its shaft, said electrical terminal structure including a metal insert secured in said body of resilient insulation, said screw-threaded passage being formed in said metal insert.

9. An electrical terminal structure in accordance with claim 1 for interconnecting two inserted circuit connectors, including paired screws, threaded passages, female-threads coaxial with the respective threaded passages, and bearing areas, all related as aforesaid, said terminal structure including a metal insert incorporating said threaded passages and including a metal plate affording said bearing areas for interconnecting inserted circuit connectors.

10. An electrical terminal structure for securing an inserted circuit connector, including a body of insulation, a metal insert in said body providing a bearing area against which a circuit connector is to be tightened, said body having an opening therein for admitting a circuit connector to said bearing area, a screw-threaded passage in said metal insert, said body including means forming a cavity having a female screw thread coaxial with said screw-threaded passage, and a screw having an abutment portion for clamping an inserted circuit connector against said bearing area and having a screw-threaded shaft for cooperation with said screw-threaded passage in the metal insert, a portion of said screw having a male screw thread for cooperation with said female screw thread of the cavity in said body, said body being of yielding material and said male and female screw threads each having a surface extending at least approximately transverse to the screw axis and each having another surface merging with the transverse surface at a ridge and sloping inward toward the screw axis and away from said bearing area, for accommodating a latitude of out-of-step relationship of the male screw-thread mating with the female thread of the cavity relative to the screw-threaded shaft mating with the threaded passage.

11. An electrical terminal structure for securing an inserted circuit connector, including a body of insulation, a metal insert in said body providing a bearing area against which a circuit connector is to be tightened, said body having an opening therein for admitting a circuit connector to said bearing area, a screw-threaded passage in said metal insert, said body including means forming a cavity having a female screw thread coaxial with said screw-threaded passage, and a screw having an abutment portion for clamping an inserted circuit connector against said bearing area and having a screw-threaded shaft for cooperation with said screw-threaded passage in the metal insert, a portion of said screw having a male screw-thread for cooperation with said female screw-thread of the cavity in said body, said female screw-thread of the cavity terminating at sufficient distance from said bearing area in proportion to the screw to provide a clearance space between said female screw-thread and the screw when said abutment portion of the screw approaches clamping engagement with an inserted circuit connector on said bearing area.

References Cited

UNITED STATES PATENTS

| 2,010,710 | 8/1935 | Bakke | 339—198.5 |
| 2,922,139 | 1/1960 | Ustin | 339—272 |
| 3,056,103 | 9/1962 | Kulka | 339—198 |

FOREIGN PATENTS

| 174,095 | 2/1953 | Austria. |
| 69,240 | 5/1958 | France. |

RICHARD E. MOORE, *Primary Examiner.*